G. W. BROWN.
Corn-Planter.
No. 1,038
Reissued Sept. 11, 1860.
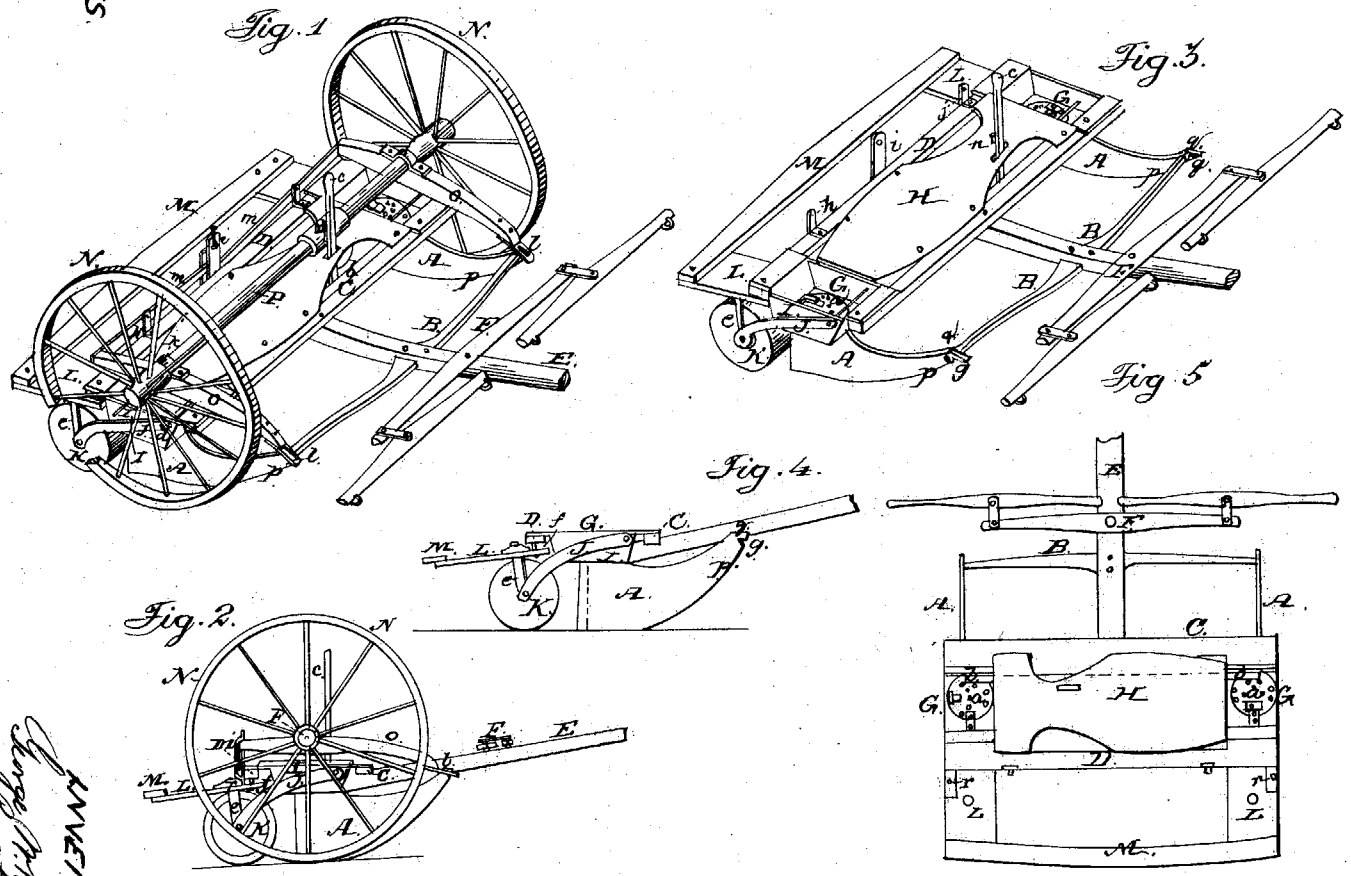
WITNESSES.
G. Cohen
F. Kirsch
INVENTOR:
George W. Brown
By atty.
A. B. Stoughton
N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 9,893, dated February 2, 1853; Reissue No. 523, dated February 16, 1858; Reissue No. 1,038, dated September 11, 1860.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the same, reference being had to the accompanying drawings, making a part of this specification, in which—

Figure 1 represents a perspective view of my seed-planting machine arranged for automatic or "machine dropping," as it is termed. Fig. 2 represents a side elevation of the same. Fig. 3 represents the same machine arranged for hand-dropping. Fig. 4 represents a side elevation, and Fig. 5 a top plan of the machine as arranged for hand-dropping, as shown in Fig. 3.

Similar letters of reference, where they occur in the several figures, denote corresponding parts of the machine in all the drawings.

In a seed-planting machine that is composed, mainly, of frame-work, and that is supported by and carried on not less than two runners and not less than two wheels, it is important that there should be a joint somewhere between the supporting-points of the machine upon the ground for several reasons, and among them I mention the following, viz: that one part of the machine may be raised, lowered, adjusted, or supported on the other part of the machine, for defining the depth of planting, for passing over intervening obstacles, and for turning the machine around at the end of the rows or furrows.

The nature of this part of my invention consists in combining with a seed-planting machine constructed, principally, of frame-work, and with not less than two runners and two wheels, a hinged joint between the point of the tongue and the rear part of the machine, (or between what I term its "ground-supports,") so that one part may, by means of said hinge-joint, be raised, lowered, adjusted, or supported on the other part, for purposes herein mentioned, meaning by "one part" and the "other part" the part in advance and the part in rear of said hinge-joint.

To enable others skilled in the art to make and use this invention, I will proceed to describe the same with reference to the drawings.

A A represent a pair of runners or shoes, properly braced apart by cross-pieces B C D in any manner that will make them sufficiently rigid, and at a distance from each other equal to that between the rows or hills of corn or other seeds to be planted.

E is a tongue, united to the cross-pieces in any of the usual modes, so as to be midway between the pair of runners, to make a center draft. To this tongue, which may be said to constitute a part of the frame of the machine, the double-trees F, to which the beam is hitched, is fastened. The seed-hoppers G G may be secured to this frame immediately over the rear of the runners. The seed slides or valves *a*, that allow the grains in measured quantities to pass out of these hoppers and into the gash or furrow prepared for them by the runners, may be connected together by a bar, *b*, to which a lever, *c*, or its equivalent, is attached, so that the attendant, from his seat or stand H, may readily see the previously-made marks in the ground and operate the lever *c* to make the droppings conform thereto.

To the side pieces, I, of the frame are connected two bars or levers, J J, (one on each side,) by a pivot-pin or hinge-joint at *d* at their front ends, and their rear ends supported on the journals of the rollers or wheels K, said journals acting as the fulcra of said levers J. To these journals may also be connected the stirrup-straps *e*, to which the pieces or levers L L are attached, the rear ends of the pieces L being connected by a cross-bar, M, which the driver or attendant may seize, and by raising it up or pressing it down correspondingly lower or raise the pieces I, and through them the runners A, by means of the fulcra or supports on the wheels K and the hinged connections. The pieces L extend forward of the braces or stirrups *e*, and have a yielding or hinged connection with the cross-piece D by a bolt and slot at *f*, or otherwise, so that the rollers or wheels may rise and fall in passing over the usual inequalities of the ground without disturbing the runners or shoes. This constitutes, mainly, the frame-work, which is simple, cheap, strong, and efficient, and possessing the property of allowing that part in front of the joint and that part in rear of it to accommodate themselves independently of each other to the natural roughness of the ground, while at the same time the operator, by means of the levers L L and their connections, can raise up, lower, carry, support, or adjust one of the frames upon the other at pleasure, as follows: The hinge-joint at *d* admits of the runners A being raised up out of the ground to pass any obstacle, but particularly facilitates the turning around of the machine at the ends of the furrows, for unless then raised up it would strain the machine very much, as the heels of the runners are sunk several inches in the ground, and offer considerable resistance in turning. In thus raising up the seeding part of the machine or the runners the tongue E, the point of which is attached to the necks of the horses, is one fixed point, and the wheels K are the other fixed or supporting points, so that by using the lever M the shoes are raised up and suspended, if necessary, on these fixed points. It is immaterial whereabout between these fixed or bearing points the hinge-joint is located, so that the runners are suspended, carried, or controlled by the point of the tongue and the wheels K through the hinge-joint and the lever-connections between them.

Having thus fully described the nature and object of my invention, what I claim under this Patent is—

In combination with a seed-planting machine, constructed, principally, of frame-work with not less than two runners and not less than two wheels, a hinged joint between the point of the tongue and the rear part of the machine, so that one part of the frame-work may be raised, lowered, adjusted, or supported on the other part, substantially as described.

GEO. W. BROWN.

Witnesses:
A. B. STOUGHTON,
E. COHEN.